(12) United States Patent
Ikeda (10) Patent No.: US 11,323,581 B2
(45) Date of Patent: May 3, 2022

(54) IMAGE READING APPARATUS

(71) Applicant: CANON KABUSHIKI KAISHA, Tokyo (JP)

(72) Inventor: Masahito Ikeda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/145,062

(22) Filed: Jan. 8, 2021

(65) Prior Publication Data
US 2021/0243317 A1 Aug. 5, 2021

(30) Foreign Application Priority Data

Jan. 31, 2020 (JP) .............................. JP2020-015840

(51) Int. Cl.
*H04N 1/00* (2006.01)
(52) U.S. Cl.
CPC ..... *H04N 1/00602* (2013.01); *H04N 1/00588* (2013.01); *H04N 1/00795* (2013.01)
(58) Field of Classification Search
CPC ........... H04N 1/00602; H04N 1/00795; H04N 1/00588; H04N 1/00554; H04N 1/00559; H04N 2201/0094; H04N 1/00037; H04N 1/00557; H04N 1/00045; H04N 1/00082; H04N 1/00543; H04N 1/00057; H04N 1/10; H04N 1/00092; H04N 1/00403; H04N 1/00411; H04N 1/00477; H04N 1/00488; H04N 1/00551; H04N 1/00564; H04N 1/00567; H04N 1/00612; H04N 1/00618; H04N 1/00631; H04N 1/00708; H04N 1/0071; H04N 1/00737; H04N 1/00748; H04N 1/00753; H04N 1/00811; H04N 1/04; H04N 1/1061; H04N 1/38; H04N 1/3873; H04N 2201/0081; H04N 1/00002; H04N 1/00005; H04N 1/00015; H04N 1/00018;
(Continued)

(56) References Cited

U.S. PATENT DOCUMENTS 5,528,352 A * 6/1996 Ichinokawa ......... B65H 3/5223
271/121
9,900,457 B2 * 2/2018 Morimoto .......... H04N 1/00551
(Continued)

FOREIGN PATENT DOCUMENTS

JP 2017214193 A 12/2017

*Primary Examiner* — Negussie Worku
(74) *Attorney, Agent, or Firm* — Canon U.S.A., Inc. I.P. Division (57) ABSTRACT

An image reading apparatus includes an opening/closing unit, an output gear, an apparatus main body having an image reading unit, a retard roller, and an input gear, and includes an opening/closing unit having a pickup roller, a feed roller, a feed roller shaft, a drive shaft, and an adjustment support portion. The feed roller shaft supports the feed roller. The drive shaft is connected at one end side thereof to the feed roller shaft via a coupling. The feed roller shaft is removable from the drive shaft. The input gear meshes with the output gear to transmit a driving force to the feed roller where the opening/closing unit is closed, and is separated from the output gear where the opening/closing unit is opened. The adjustment support portion supports the other end side of the drive shaft to adjust a position for supporting the drive shaft.

7 Claims, 7 Drawing Sheets

(58) Field of Classification Search
CPC ........... H04N 1/00023; H04N 1/00034; H04N 1/00058; H04N 1/00068; H04N 1/00074; H04N 1/00087; H04N 1/0009; H04N 1/00127; H04N 1/00137; H04N 1/00151; H04N 1/00185; H04N 1/00204; H04N 1/00206; H04N 1/00212; H04N 1/00241; H04N 1/00244; H04N 1/00307; H04N 1/00315; H04N 1/00323; H04N 1/00331; H04N 1/00352; H04N 1/00384; H04N 1/00408; H04N 1/00413; H04N 1/0044; H04N 1/00442; H04N 1/00474; H04N 1/00496; H04N 1/00519; H04N 1/00525; H04N 1/0053; H04N 1/00533; H04N 1/00535; H04N 1/00562; H04N 1/00578; H04N 1/00596; H04N 1/00628; H04N 1/00644; H04N 1/00652; H04N 1/00655; H04N 1/0066; H04N 1/00681; H04N 1/00684; H04N 1/00702; H04N 1/00713; H04N 1/00724; H04N 1/00734; H04N 1/00742; H04N 1/00758; H04N 1/00763; H04N 1/00769; H04N 1/00774; H04N 1/00779; H04N 1/0079; H04N 1/00806; H04N 1/00816; H04N 1/0083; H04N 1/00832; H04N 1/00891; H04N 1/00896; H04N 1/00909; H04N 1/00933; H04N 1/0097; H04N 1/00997; H04N 1/0249; H04N 1/02815; H04N 1/02825; H04N 1/0283; H04N 1/0288; H04N 1/02885; H04N 1/0289; H04N 1/047; H04N 1/053; H04N 1/0834; H04N 1/0891; H04N 1/1013; H04N 1/1017; H04N 1/1065; H04N 1/113; H04N 1/1215; H04N 1/129; H04N 1/19594; H04N 1/207; H04N 1/3208; H04N 1/32128; H04N 1/3263; H04N 1/32657; H04N 1/387; H04N 1/3878; H04N 1/4097; H04N 1/4433; H04N 1/508; H04N 1/6033; H04N 2201/0096; B65H 2220/01; B65H 2511/10; B65H 2511/11; B65H 2220/02; B65H 2220/03; B65H 2402/45; B65H 2511/12; B65H 2405/115; B65H 2511/20; B65H 2511/415; B65H 2513/41; B65H 2513/51; B65H 1/266; B65H 2301/133; B65H 2301/4212; B65H 2301/51214; B65H 2402/46; B65H 2404/632; B65H 2405/11151; B65H 2405/1124; B65H 2405/1412; B65H 2407/21; B65H 2511/51; B65H 2551/20; B65H 2601/325; B65H 2801/06; B65H 2801/15; B65H 29/52; B65H 29/58; B65H 31/02; B65H 43/00; B65H 16/02; B65H 1/02; B65H 1/04; B65H 2301/413; B65H 2301/5143; B65H 23/038; B65H 2402/441; B65H 2404/144; B65H 2405/324; B65H 2407/311; B65H 2511/414; B65H 2511/417; B65H 2513/50; B65H 2513/514; B65H 2601/11; B65H 2601/212; B65H 2601/321; B65H 2801/12; B65H 5/062; B65H 7/08; B65H 7/12; B65H 7/20; B65H 9/00; B65H 9/008; G09G 5/003
USPC ........................................................ 358/498
See application file for complete search history.

(56) References Cited

U.S. PATENT DOCUMENTS

| | | | | |
|---|---|---|---|---|
| 10,274,857 | B2* | 4/2019 | Yamada | G03G 15/20 |
| 10,392,211 | B2* | 8/2019 | Hishinuma | G03B 27/6264 |
| 10,841,440 | B2* | 11/2020 | Miwa | H04N 1/00615 |
| 2014/0226172 | A1* | 8/2014 | Kadobayashi | H04N 1/00588 |
| | | | | 358/1.13 |
| 2017/0257512 | A1* | 9/2017 | Ogawa | H04N 1/10 |
| 2017/0279991 | A1* | 9/2017 | Shiota | H04N 1/00588 |
| 2019/0174019 | A1* | 6/2019 | Ooki | H04N 1/4076 |
| 2019/0238697 | A1* | 8/2019 | Miwa | B65H 29/50 |
| 2019/0389680 | A1* | 12/2019 | Miyagawa | H04N 1/00588 |
| 2020/0385226 | A1* | 12/2020 | Hishinuma | G03G 15/6567 |

* cited by examiner

IMAGE READING APPARATUS

BACKGROUND

Field

The present disclosure relates to an image reading apparatus that separates and conveys documents one by one, and reads an image of the conveyed document.

Description of the Related Art

Among scanners mounted on copiers, one type of scanner including an automatic document feeder (ADF) that separates and conveys documents on a document tray one by one has been widespread. When documents are fed by the ADF, a paper jam may occur during conveyance in some cases. To clear the paper jam, various measures are adopted on products. As a representative example of such measures, there is a method of providing a configuration in which an opening/closing unit serving as an ADF cover and including one of a pair of conveyance guides facing each other is openable, and exposing a conveyance path from an apparatus main body by opening the opening/closing unit so that a user can remove a document on the exposed conveyance path.

In general, in the ADF, a feeding roller for feeding a document is disposed on the side of the opening/closing unit (the ADF cover) including an upper conveyance guide. Meanwhile, a drive source for transmitting a driving force to the feeding roller is disposed on the opposite side, which is the apparatus main body including a lower conveyance guide. In such a configuration, a drive transmission gear on the opening/closing unit side is separated from a drive transmission gear on the apparatus main body side by opening of the opening/closing unit to clear a paper jam (see Japanese Patent Application Laid-Open No. 2017-214193).

In the configuration in which the drive transmission gear on the opening/closing unit side becomes separated from the drive transmission gear on the apparatus main body side, the number of intervening components and related dimensions increase, and deformation also increases by the increase in the number of components, as compared with a configuration in which adjacent gears are positioned as one component. As a result, the accuracy of the distance between the gears is reduced. In a case where the distance between the gears is too short, the gears can bite into each other, leading to an increase in torque. In a case where the distance between the gears is too long, the transmission of the driving force can be insufficient, so that there is a risk of a drive transmission failure or vibration noise.

SUMMARY

The present disclosure is directed to a way of adjusting the distance between a gear in an apparatus main body and a gear in an opening/closing unit.

According to an aspect of the present disclosure, an image reading apparatus includes an apparatus main body, an opening/closing unit configured to open and close relative to the apparatus main body, an image reading unit included in the apparatus main body and configured to read an image of a document conveyed on a conveyance path formed in a state where the opening/closing unit is closed, a pickup roller included in the opening/closing unit and configured to abut on a top surface of the document on a document tray and feed the document toward the conveyance path, a feed roller included in the opening/closing unit and configured to convey the document fed by the pickup roller, a retard roller included in the apparatus main body and configured to nip the document with the feed roller and separate documents fed by the pickup roller, one by one, with the feed roller, a feed roller shaft included in the opening/closing unit and configured to support the feed roller, a drive shaft included in the opening/closing unit and connected at one end side thereof to the feed roller shaft via a coupling, wherein the feed roller shaft is configured to be removable from the drive shaft, an output gear fixed to another end side of the drive shaft and configured to transmit a driving force to the feed roller, an input gear included in the apparatus main body and configured to mesh with the output gear to transmit a driving force to the feed roller in a case where the opening/closing unit is closed, and configured to be separated from the output gear in a case where the opening/closing unit is opened, and an adjustment support portion included in the opening/closing unit and supporting the other end side of the drive shaft, wherein the adjustment support portion is configured to adjust a position for supporting the drive shaft.

Further features of the present disclosure will become apparent from the following description of exemplary embodiments with reference to the attached drawings.

DESCRIPTION OF THE EMBODIMENTS

[Automatic Document Feeder Configuration]

Figure 1:
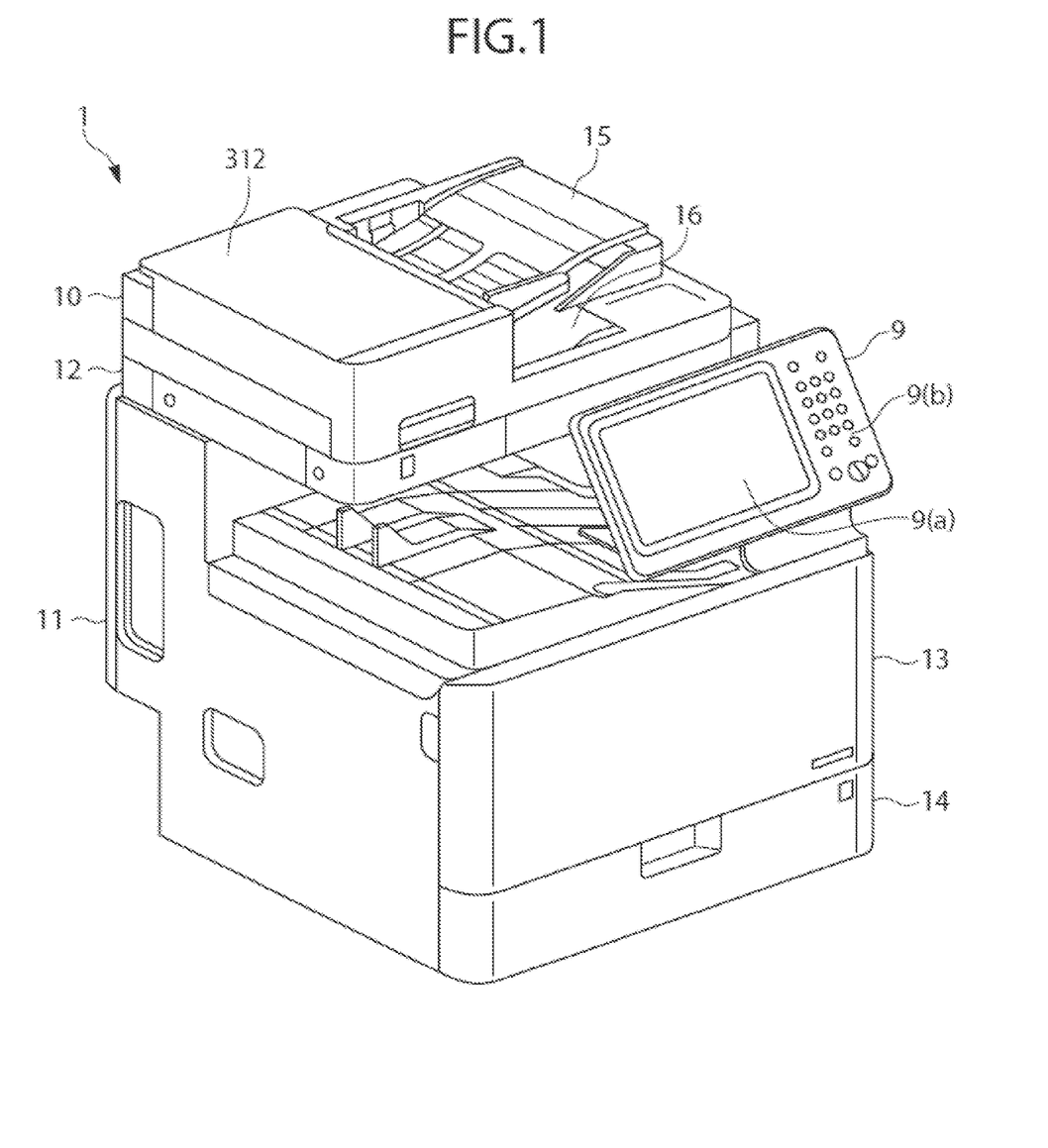
FIG. 1 illustrates an image forming apparatus on which an automatic document feeder (ADF) is mounted.
Figure 2:
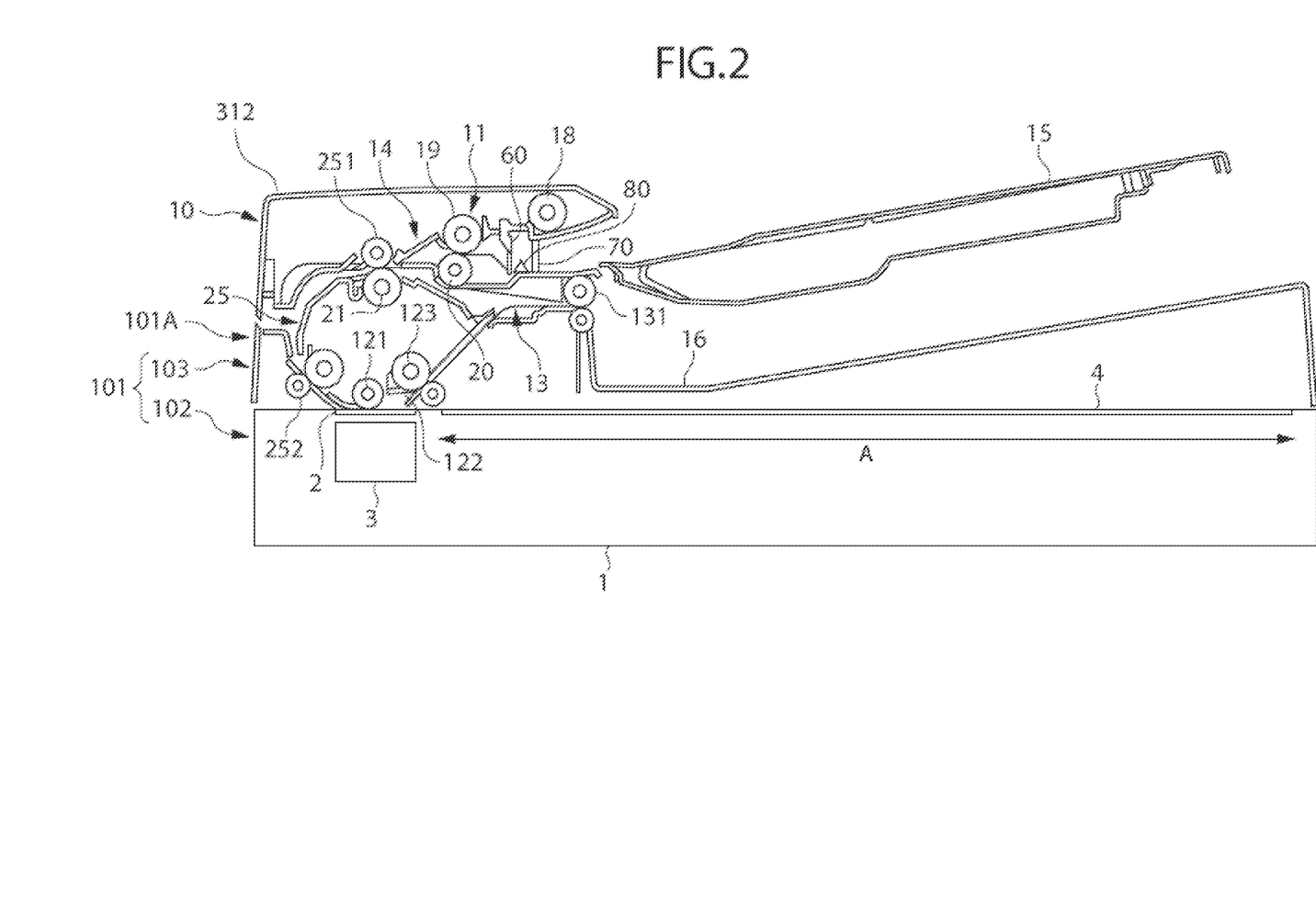
FIG. 2 is a cross-sectional diagram illustrating the ADF and an image reading apparatus.

Document conveyance operation of an automatic document feeder (ADF) 10, which is one of image reading apparatuses, will be described with reference to FIGS. 1 and 2. The ADF 10 includes an apparatus main body 101A and an opening/closing guide serving as an opening/closing unit that opens and closes relative to the apparatus main body 101A. In the ADF 10, a conveyance path is formed between the apparatus main body 101A and the opening/closing guide when the opening/closing guide is closed relative to the apparatus main body 101A. A document conveyed along this conveyance path is read by a scanner unit 1, and discharged onto a discharge tray 16 by a discharge roller pair 131.

The apparatus main body 101A includes a document tray 15 in an upper part. When a user places a document bundle on the document tray 15, a sheet detection sensor 70 or 80 detects this document bundle. Here, when the document bundle is placed, the leading edge of the document bundle is regulated by a stopper 60 not to be excessively inserted into the conveyance path. When a start button on an operation unit 9 is pressed in a state where the document bundle is placed, a motor (not illustrated) is driven, so that the document conveyance operation begins.

Further, in the ADF 10, a feeding roller (a pickup roller) 18 that abuts on the top surface of the uppermost document on the document tray 15 and feeds the document toward the conveyance path is disposed in the opening/closing guide 312 serving as the opening/closing unit. The documents on the document tray 15 are fed by the feeding roller 18, and the fed documents are separated and conveyed one by one by a pair of separation rollers that are an upper separation roller 19 (a feed roller) in the opening/closing guide 312 and a lower separation roller (a retard roller) in the apparatus main body 101A. The upper separation roller 19 and the lower separation roller 20 are rollers for separating and conveying the documents fed by the feeding roller 18, one by one. The documents separated and conveyed one by one by the upper separation roller 19 and the lower separation roller 20 are further conveyed downstream by conveyance roller pairs 251, 252, and 123 located downstream of the pair of separation rollers 19 and 20. Each of the documents conveyed by the conveyance roller pairs 251, 252, and 123 passes through a gap between a flow reading glass plate 2 of the scanner unit 1 and a platen roller 121 while running on the flow reading glass plate 2, and an image thereof is read by a reading unit 3. After the image is read, the document is discharged onto the discharge tray 16 by the discharge roller pair 131.

[Configuration of Portion Around Separation Roller]

For the conveyance of the ADF 10, the conveyance roller pairs 123, 251, and 252 are each used as the combination of a drive roller and a following roller. The following roller is not a roller for driving and thus has no document conveying force. However, because the following roller does not work as resisting force in conveying the document, the conveyance ability of this pair of rollers is relatively stable. Specifically, skew and roller slippage are unlikely to occur while the document is conveyed, and the geometrical characteristics of the read image are easily stabilized.

In contrast, the pair of separation rollers 19 and 20 have properties different from those of the conveyance roller pairs 123, 251, and 252 describe above, and this will be described in detail.

The documents placed on the document tray 15 are fed by the feeding roller 18 and sent into a nip between the upper separation roller 19 and the lower separation roller 20. The lower separation roller 20 is configured not to rotate in a conveyance direction unless predetermined torque is applied by a torque limiter (not illustrated). Therefore, in a case where the leading edges of a plurality of sheets arrive at the nip between the pair of separation rollers 19 and 20 while overlapping each other, only the uppermost sheet is conveyed by abutting the upper separation roller 19. The leading edges of the sheets under the uppermost sheet abut on the surface of the lower separation roller 20 and stop at the abutting position until the uppermost sheet leaves the nip. In this way, the documents can be separated and conveyed one by one by a separation portion configured of the upper separation roller 19 and the lower separation roller 20.

Therefore, in the separation portion, the document receives a conveying force and conveyance resistance simultaneously and thus the conveyance ability is unstable, so that destabilization of the geometrical characteristics is likely to occur.

Figure 3:
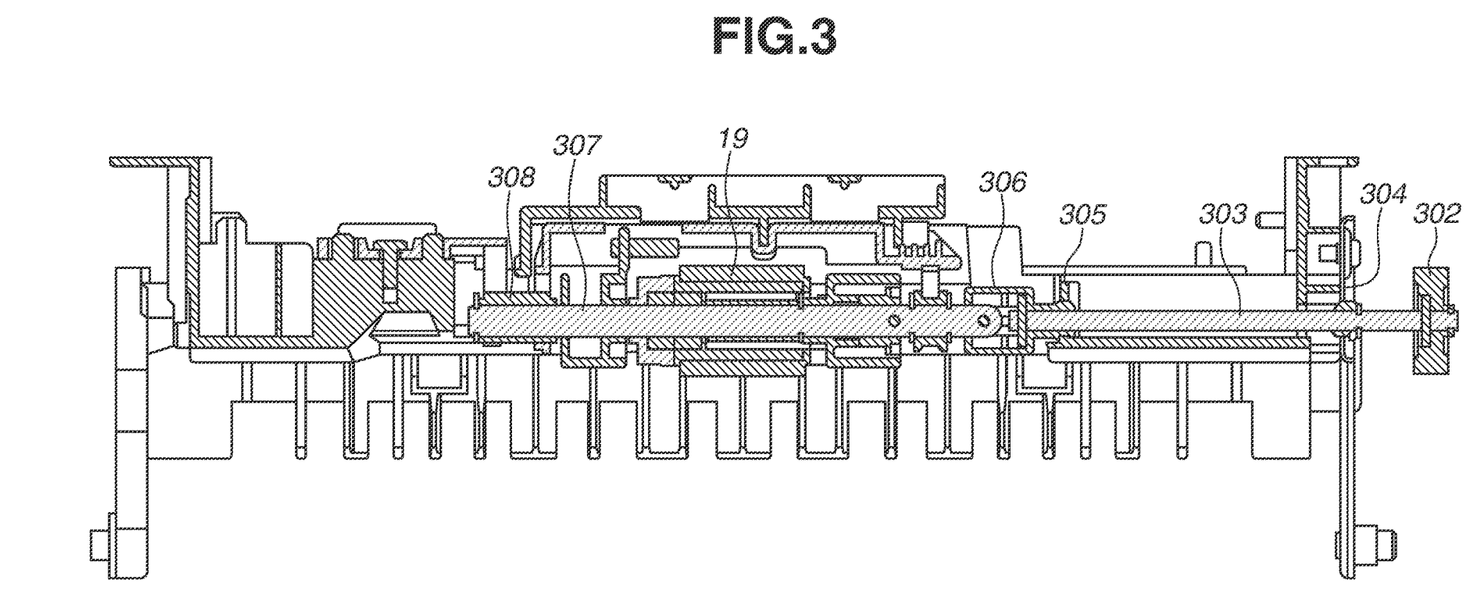
FIG. 3 is a transverse cross-sectional diagram illustrating a portion around an upper separation roller.
Figure 4:
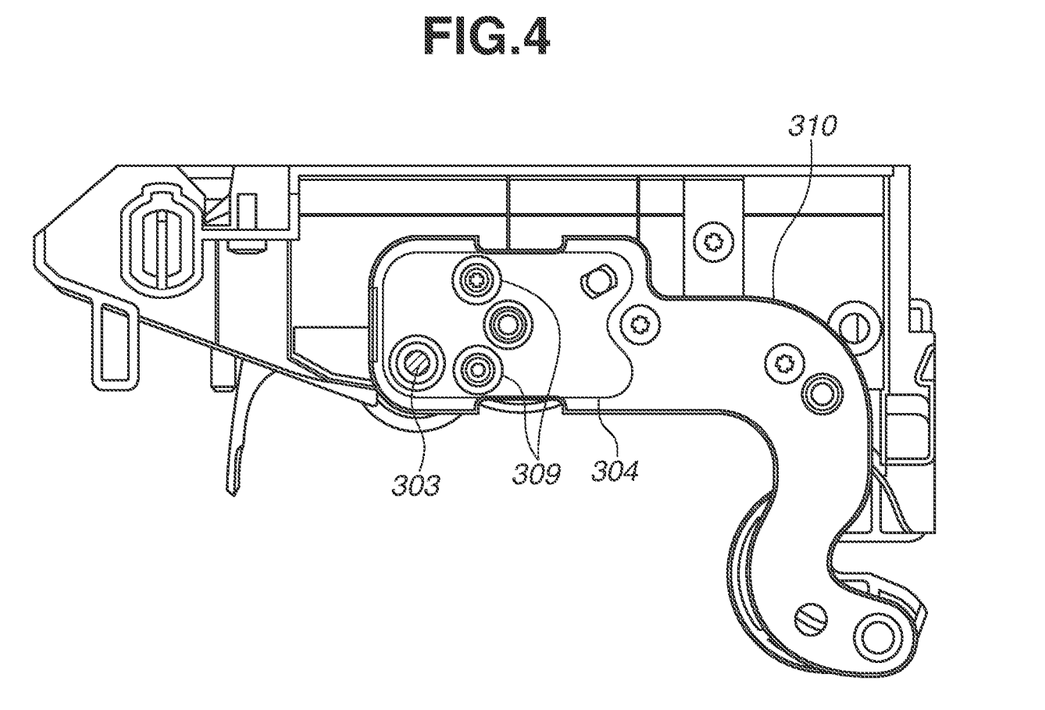
FIG. 4 is a back-side view of the portion around the upper separation roller.

A configuration of a portion around the upper separation roller 19 according to an exemplary embodiment will be described with reference to FIGS. 3, 4, and 5. To transmit a driving force to the upper separation roller 19, a drive shaft 303 to which an output gear 302 is fixed is disposed in the opening/closing guide 312 serving as the opening/closing unit. A coupling 306 (a shaft joint) is attached to one end side (the side close to the upper separation roller 19 relative to the center of the drive shaft 303 in the axial direction) of the drive shaft 303. Further, the output gear 302 is fixed to the other end side of the drive shaft 303. A separation roller shaft 307 is connected to the one end side of the drive shaft 303 via the coupling 306. The drive shaft 303 is rotatably supported by an adjustment support portion 304 and a fixed support portion 305 of the opening/closing guide 312 via a bearing.

The adjustment support portion 304 is an example of a support position adjustment unit. The adjustment support portion 304 supports the other end side of the drive shaft 303, i.e., the side close to the output gear 302, and can move relative to the opening/closing guide 312 in a normal plane (in the paper plane in FIG. 4) of the drive shaft 303. A position for supporting the drive shaft 303 can be thereby adjusted. The distance between the output gear 302 and an input gear 301 to be described below can be finely adjusted by providing such a position adjustment unit.

The fixed support portion 305 supports the one end side of the drive shaft 303, i.e., the side close to the coupling 306. The fixed support portion 305 is a member fixed to the opening/closing guide 312, unlike the above-described adjustment support portion 304.

The separation roller shaft 307 is coaxially arranged with the drive shaft 303, and supports the upper separation roller 19. The separation roller shaft 307 is supported at both ends by a fixed support portion 308 of the opening/closing guide 312 and by the coupling 306. The rotation of the drive shaft 303 is transmitted to the separation roller shaft 307 via the coupling 306.

The adjustment support portion 304 is obtained by molding sheet metal, and disposed in the opening/closing guide 312 via a guide arm 310 also obtained by molding sheet metal. The position of the adjustment support portion 304 can be adjusted in the range of ±1 mm in each direction in the paper plane of FIG. 4, and the adjustment support portion 304 is fixed to the guide arm 310 by a fastening portion 309 such as a screw.

Figure 5:
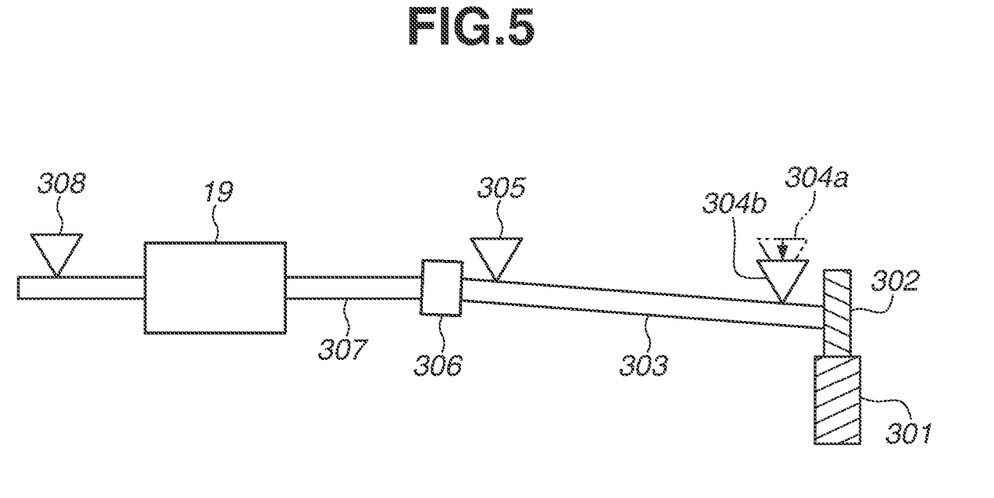
FIG. 5 is a schematic diagram illustrating a configuration according to an exemplary embodiment

FIG. 5 is a schematic diagram illustrating a configuration according to the present exemplary embodiment. As illustrated in FIG. 5, the adjustment support portion 304 can be adjusted from an original designated position 304a to a position 304b for optimizing the distance between the gears. In this way, the adjustment support portion 304 is movable relative to the guide arm 310, and providing such an adjustment mechanism has the following benefits.

The conveyance path in the apparatus main body 101A and the opening/closing guide 312 of the ADF 10 can be exposed by opening the opening/closing guide 312 away from the apparatus main body 101A, for restoration processing to be performed when a paper jam occurs. In this process, the input gear 301 of the apparatus main body 101A and the output gear 302 of the opening/closing guide 312 move away from each other, and thus the accuracy of the distance between the gears is not easily achieved. To deal with this situation, the ADF 10 of the present exemplary embodiment has the above-described configuration to improve the accuracy of the distance between the input gear 301 and the output gear 302. In production assembly, the support position of the adjustment support portion 304 is adjusted using a jig, so that the accuracy of the distance between the input gear 301 and the output gear 302 is guaranteed. A drive transmission failure, unpleasant vibration noise, etc. can be thereby reduced.

Even in a case where the drive shaft 303 is obliquely aligned with the separation roller shaft 307, the separation roller shaft 307 can be held in a substantially horizontal position, because the end of the separation roller shaft 307 is supported by the coupling 306 near the fixed support portion 305. The nip-pressure distribution of the upper separation roller 19 can be thereby made uniform in the longitudinal direction of the separation roller shaft 307. In particular, making the distribution of the nip pressure of the separation portion uniform produces a great effect in improving the conveyance geometrical characteristics of the document.

[Attachment/Detachment of Sheet Feeding Portion Unit]

The feeding roller 18, the upper separation roller 19, and the lower separation roller 20 are portions bearing a heavy burden due to the above-described instability of conveyance, and thus the rubber thereof quickly wears. If a user keeps using the worn roller, slipping of the roller may occur and issues such as a feeding failure and double feeding easily occur. Thus, in many products, the rollers of a sheet feeding portion and a separation portion are replaced depending on the status of use of a machine. In the past, a service member has replaced a roller in many cases, but in recent years, there have been products that allows users to carry out the replacement to reduce the running cost. In such a case, it is desirable to provide a configuration that allows a user inexperienced in replacement work to replace a roller easily.

Figure 7:
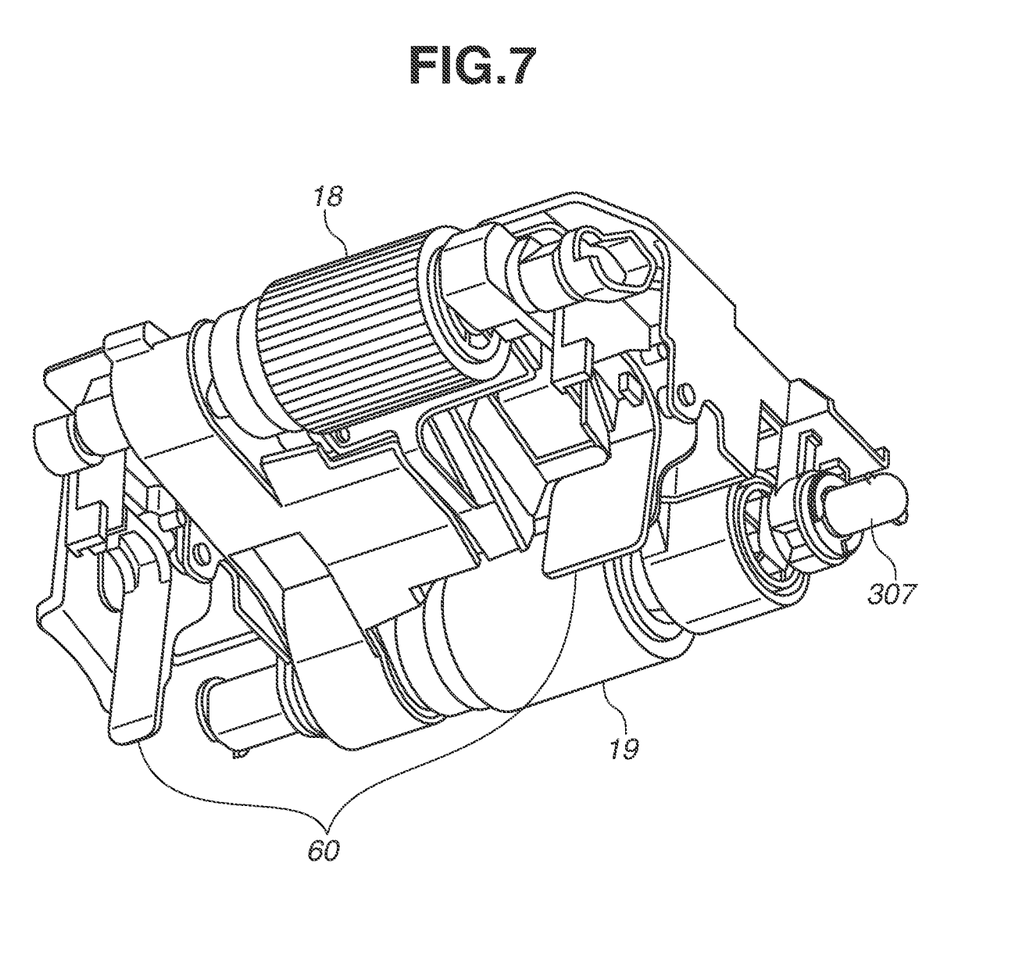
FIG. 7 is a perspective view of a separation roller unit.

In the ADF 10 of the present exemplary embodiment as well, as illustrated in FIG. 7, the feeding roller 18, the upper separation roller 19, and the separation roller shaft 307 can be attached to and detached from the opening/closing guide 312 as one unit so that the user can replace the rollers. In other words, the separation roller shaft 307 can be removed from the drive shaft 303. This configuration can provide high replaceability while securing the geometrical characteristics and the accuracy of the distance between the gears described above.

[Modification]

Figure 6:
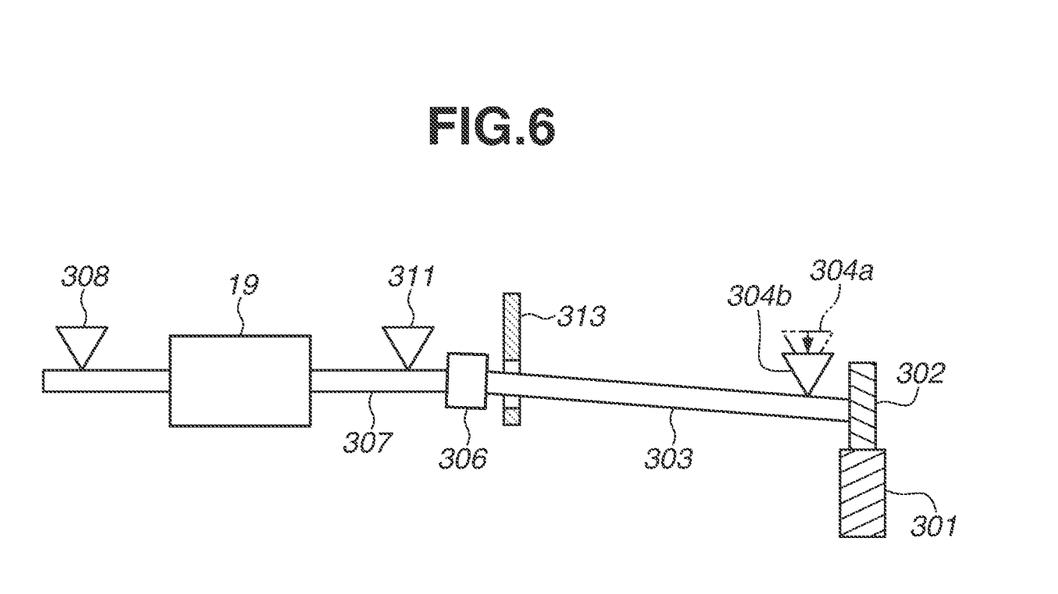
FIG. 6 is a schematic diagram illustrating a configuration according to a modification of the exemplary embodiment.

FIG. 6 illustrates a modification of the above-described exemplary embodiment. In the configuration illustrated in FIG. 5, the drive shaft 303 is supported at both ends by the adjustment support portion 304 and the fixed support portion 305, one end side of the separation roller shaft 307 is supported by the fixed support portion 308, and the other end side thereof is supported by the coupling 306. However, as illustrated in FIG. 6, the separation roller shaft 307 may be supported at both ends by the fixed support portion 308 and a fixed support portion 311, one end side of the drive shaft 303 may be supported by the adjustment support portion 304, and the other end side of the drive shaft 303 may be supported by the coupling 306.

In this case, to maintain replaceability of the sheet feeding portion unit, for example, a temporary holding portion 313 is provided. The temporary holding portion 313 has a hole slightly larger than the shaft diameter and formed near the coupling 306 to surround the drive shaft 303. This prevents the drive shaft 303 from greatly deviating from a predetermined position even when the sheet feeding portion unit is removed, so that a more desirable configuration is achieved.

In the above-described exemplary embodiment, the coupling 306 is described to be fixed to an end portion of the drive shaft 303. However, similar performance and effects can be obtained even when the coupling 306 is fixed to an end portion of the separation roller shaft 307 instead of the drive shaft 303.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-015840, filed Jan. 31, 2020, which is hereby incorporated by reference herein in its entirety.

What is claimed is:

1. An image reading apparatus comprising:
an apparatus main body configured to convey a document;
an opening/closing unit configured to open and close relative to the apparatus main body wherein the opening/closing unit is movable between a closed position where the opening/closing unit forms a conveyance path and an open position where the conveyance path is exposed;
an image reading unit configured to read an image of the document conveyed on the conveyance path;
a pickup roller included in the opening/closing unit and configured to abut on a top surface of the document on a document tray and feed the document toward the conveyance path;
a feed roller included in the opening/closing unit and configured to convey the document fed by the pickup roller;
a separating portion included in the apparatus main body and configured to nip the document with the feed roller and separate documents fed by the pickup roller, one by one, with the feed roller;
a feed roller shaft included in the opening/closing unit and configured to support the feed roller;
a drive shaft included in the opening/closing unit and configured to transmit a driving force to the feed roller shaft;
a coupling member configured to couple the drive shaft and the feed roller shaft;
a first gear fixed to the drive shaft and configured to transmit the driving force to the drive shaft;
a second gear included in the apparatus main body and configured to mesh with the first gear to transmit the driving force to the drive shaft in a case where the opening/closing unit is in the closed position, and configured to be separated from the first gear in a case where the opening/closing unit is in the open position; and
an adjustment portion configured to adjust a position of the first gear in the opening/closing unit,
wherein the coupling member permits the drive shaft to move relative to the feed roller shaft when the adjustment portion adjusts the position of the first gear.

2. The image reading apparatus according to claim 1, wherein the feed roller shaft is supported by a fixed support portion fixed to the opening/closing unit and by the coupling member.

3. The image reading apparatus according to claim 1, wherein the drive shaft is supported by a fixed support portion fixed to the opening/closing unit and by the coupling member.

4. The image reading apparatus according to claim 1, wherein the feed roller shaft is configured to be removable from the drive shaft.

5. The image reading apparatus according to claim 1, wherein the adjustment portion is configured to support the drive shaft and to change a supporting position where the adjustment portion supports the drive shaft to adjust the position of the first gear.

6. The image reading apparatus according to claim 5,
wherein the drive shaft is supported by a fixed support portion provided between the first gear and the coupling member in an axial direction and by the adjustment portion, and
wherein the fixed support portion is configured not to move relative to the opening/closing unit, and the adjustment portion is configured to move relative to the opening/closing unit.

7. The image reading apparatus according to claim 6, wherein the adjustment portion is configured of sheet metal.

* * * * *